United States Patent  (10) Patent No.: US 9,351,238 B2
Joung et al.                   (45) Date of Patent:     May 24, 2016

(54) METHOD OF OFFLOADING WIRELESS DATA IN CORE NETWORK USING FEMTOCELL

(71) Applicant: INNOWIRELESS CO., LTD., Gyeonggi-do (KR)

(72) Inventors: Jin Soup Joung, Gyeonggi-do (KR); Seung Hwan Ji, Gyeonggi-do (KR); Hyun Seok Lee, Seoul (KR); Woong Jong Jeong, Jeollanam-do (KR)

(73) Assignee: INNOWIRELESS CO., LTD. (KR)

( * ) Notice: Subject to any disclaimer, the term of this patent is extended or adjusted under 35 U.S.C. 154(b) by 0 days.

(21) Appl. No.: 14/600,479

(22) Filed: Jan. 20, 2015

(65) Prior Publication Data
US 2016/0044590 A1    Feb. 11, 2016

(30) Foreign Application Priority Data
Aug. 11, 2014 (KR) .................. 10-2014-0103924

(51) Int. Cl.
H04L 12/26    (2006.01)
H04W 48/18   (2009.01)
H04W 36/22   (2009.01)
H04L 12/803  (2013.01)
H04W 28/02   (2009.01)

(52) U.S. Cl.
CPC ............. *H04W 48/18* (2013.01); *H04L 47/125* (2013.01); *H04W 28/0289* (2013.01); *H04W 36/22* (2013.01)

(58) Field of Classification Search
None
See application file for complete search history.

(56) References Cited

U.S. PATENT DOCUMENTS

2013/0142070 A1*  6/2013  Matsuo ................ H04W 40/12
                                              370/252
2015/0295833 A1* 10/2015  Mizukoshi ............ H04L 47/125
                                              370/235

FOREIGN PATENT DOCUMENTS

KR    1020120113664 A   10/2012
KR    1020130018297 A    2/2013
KR    1020140005304 A    1/2014

* cited by examiner

*Primary Examiner* — Edan Orgad
*Assistant Examiner* — Rebecca Song
(74) *Attorney, Agent, or Firm* — Kaplan Breyer Schwarz & Ottesen LLP

(57) ABSTRACT

A method of offloading wireless data in a core network using a femtocell which can reduce a traffic load of a mobile communication network and maximize convenience of a user by determining to offload the wireless data passing through the core network onto a local network according to whether the data is real-time data is provided.

4 Claims, 5 Drawing Sheets

METHOD OF OFFLOADING WIRELESS DATA IN CORE NETWORK USING FEMTOCELL

CROSS-REFERENCE TO RELATED APPLICATION

This application claims priority to and the benefit of Korean Patent Application No. 10-2014-0103924, filed on Aug. 11, 2014, the disclosure of which is incorporated herein by reference in its entirety.

FIELD OF THE INVENTION

The present invention relates to a method of offloading wireless data in a core network using a femtocell, and more particularly, to a method of offloading wireless data in a core network using a femtocell which can reduce a traffic load of a mobile communication network and maximize convenience of a user by determining to offload wireless data passing through a core network onto a local network according to whether the data is real-time data.

BACKGROUND OF THE INVENTION

Software-defined networking (SDN) is a network or paradigm of a new structure which came to the fore so as to fundamentally solve and renovate a structural problem in which a current Internet has by software, and is a concept including an application, a network operating system, hardware abstraction, a standardized interface, and hardware.

The SDN is a network structure in which a network control plane is separated from a physical network having a data transfer plane, and the separated control plane should necessarily have a plane capable of interacting with a data path on a network switch (hardware). One of the interaction or a communication mechanism is OpenFlow technology which is a standard interface for communication between a machine having the control plane and the network switch.

According to the SDN, the control plane which is called a controller is implemented in a separate machine instead of a switch or a router, and the machine may be a personal computer (PC) or a high-performance server.

Meanwhile, in third generation partnership project (3GPP) long term evolution (LTE), a station which is called an evolved nodeB (eNB) and a home eNB (HeNB) is defined. The eNB of them is a macro base station managing a general macro cell, and the HeNB is a femto base station managing a femtocell. That is, in the 3GPP, an environment in which a femto base station in which only a specific user can access besides a conventional macro base station is installed is considered. Here, the femto base station is an ultra micro mobile communication base station capable of accessing a mobile communication core network through a broadband network installed indoors such as home or office, and may be installed for the purpose of coverage increase, capacity increase, or provision of other differentiated service, etc. by a user or a business operator. A service coverage of the femto base station may be considered from at least about a few meters to a maximum macro service coverage. An example of the 3GPP LTE system as a communication system capable of being applied to a method of the present invention will be described.

FIG. 1 is a diagram for describing a principle of a conventional selective Internet protocol traffic offload (SIPTO) method, and FIG. 2 is a diagram for describing a problem according to a conventional SIPTO method. In FIGS. 1 and 2, reference numeral 10 represents a mobile communication terminal, and reference numerals 20 and 80 represent a femto base station and a macro base station managing a femtocell and a macro cell, respectively. Reference numeral 30 represents a router included in a local network, and reference numerals 40, 50, and 60 represent an Internet service provider (ISP), a mobile communication core network, for example, an evolved packet core (EPC) network, and a public data network or packet data network (PDN), respectively. Reference numerals 90 and 70 represent a local terminal and an external server connected to the router 30 of the local network and the PDN 60, respectively.

Meanwhile, in the 3GPP, standardization of two technologies which are called a local Internet protocol access (LIPA) and the SIPTO are in progress in order to solve overload of a network, and the LIPA is technology of processing data in the local network and the SIPTO is technology of selectively offloading a traffic according to destination of the traffic.

That is, as shown in FIG. 1, when the mobile communication terminal 10 transmits a specific traffic through the femto base station 20 or the macro base station 80, the SIPTO is called technology of transmitting a traffic passing through (a dotted line) the core network 50 by making a detour to the Internet 60 (through a dot dashed line) in order to reduce the overload of the core network 50.

As described above, according to the conventional SIPTO technology, since it is determined whether to offload the traffic by simply checking only a destination IP address, when the mobile communication terminal 10 deviates from a femtocell area and enters a macro cell area as shown in FIG. 2, a bearer (will be described hereinafter) should be reset. Consequently, data transmission may be inevitably delayed due to the resetting of the bearer, and when the data traffic is real-time data such as voice over IP (VOIP) voice data, inconvenience of use in which communication is disconnected may be generated due to the delay.

This work was supported by the ICT R&D program of MSIP/IITP, Republic of Korea. [13-911-05-001, Development of OpenFlow-based integrated management system for wired and wireless network]

PRIOR ART DOCUMENTS

1. Korea Patent Publication No. 10-2012-0113664 (Data transmission method and user equipment)
2. Korea Patent Publication No. 10-2014-0005304 (Method of processing data associated with session management and mobility management)
3. Korea Patent Publication No. 10-2013-0018297 (Method and apparatus for managing local Internet protocol offload)

SUMMARY OF THE INVENTION

The present invention is directed to a method of offloading wireless data in a core network using a femtocell which can reduce a traffic load of a mobile communication network and maximize convenience of a user by determining to offload the wireless data passing through the core network onto a local network according to whether the data is real-time data.

According to an aspect of the present invention, there is provided a method of offloading wireless data in a core network using a femtocell, wherein the method is performed on the wireless data passing through the core network of a mobile communication network in an SDN including an SDN switch connected to a femto base station of the mobile communication network and an Internet, and an SDN controller separated from the SDN switch and configured to control the SDN switch, the method including: (a) receiving bearer information set between the SDN controller and a mobile communication terminal from the femto base station, by the SDN controller; (b) checking whether the data passing through the core network is real-time data based on the bearer information received in the operation (a), by the SDN controller; (c) determining not to perform a selective Internet protocol traffic offload (SIPTO) when the data is the real-time data and to perform the SIPTO when the data is non-real-time data based on the checking result in the operation (b), by the SDN controller; (d) informing the femto base station and the SDN switch of the determining result whether to perform the SIPTO, by the SDN controller; (e) checking a bearer ID when the femto base station receives data from the mobile communication terminal, selecting a bearer connected to the core network or a bearer connected to an external server according to a confirmation result after confirming the determining result whether to perform the SIPTO, and transmitting corresponding data to the SDN switch using the selected bearer; and (f) directly transmitting data of which the femto base station performs the SIPTO to not the core network but an external network, by the SDN switch.

The operation (b) may check whether the data is the real-time data based on a QoS parameter included in the bearer information.

The bearer information transmitted from the femto base station in the operation (a) may include a bearer ID, a QoS parameter, a source IP address, and a destination IP address.

A message for informing the femto base station and the SDN switch of the determining result whether to perform the SIPTO in the operations (c) and (d) may include a SIPTO determination result and a bearer ID.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION

Hereinafter, exemplary embodiments of a method of offloading wireless data in a core network using a femtocell according to the present invention will be described in detail with reference to the accompanying drawings.

Figure 1:
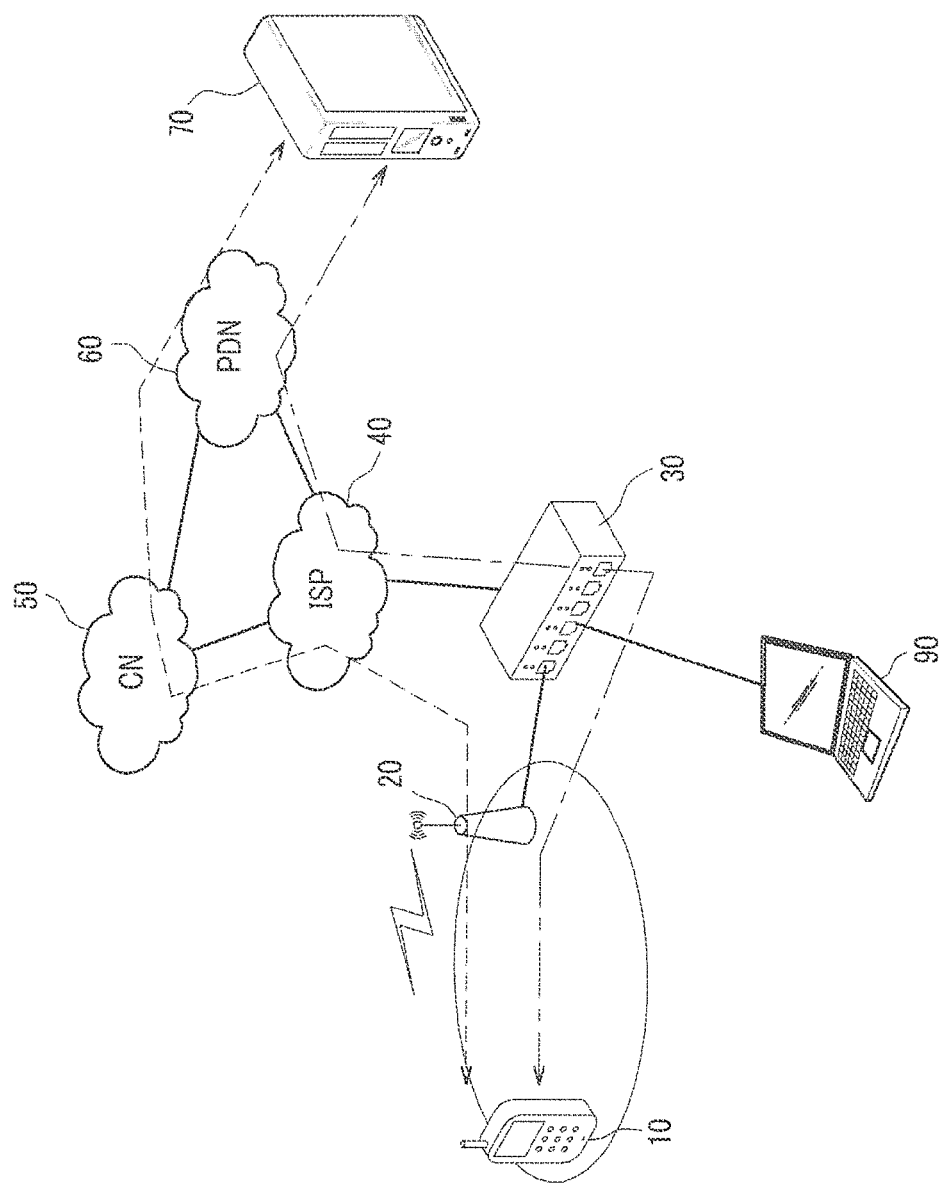
FIG. 1 is a diagram for describing a principle of a conventional selective Internet protocol traffic offload (SIPTO) method.
Figure 2:
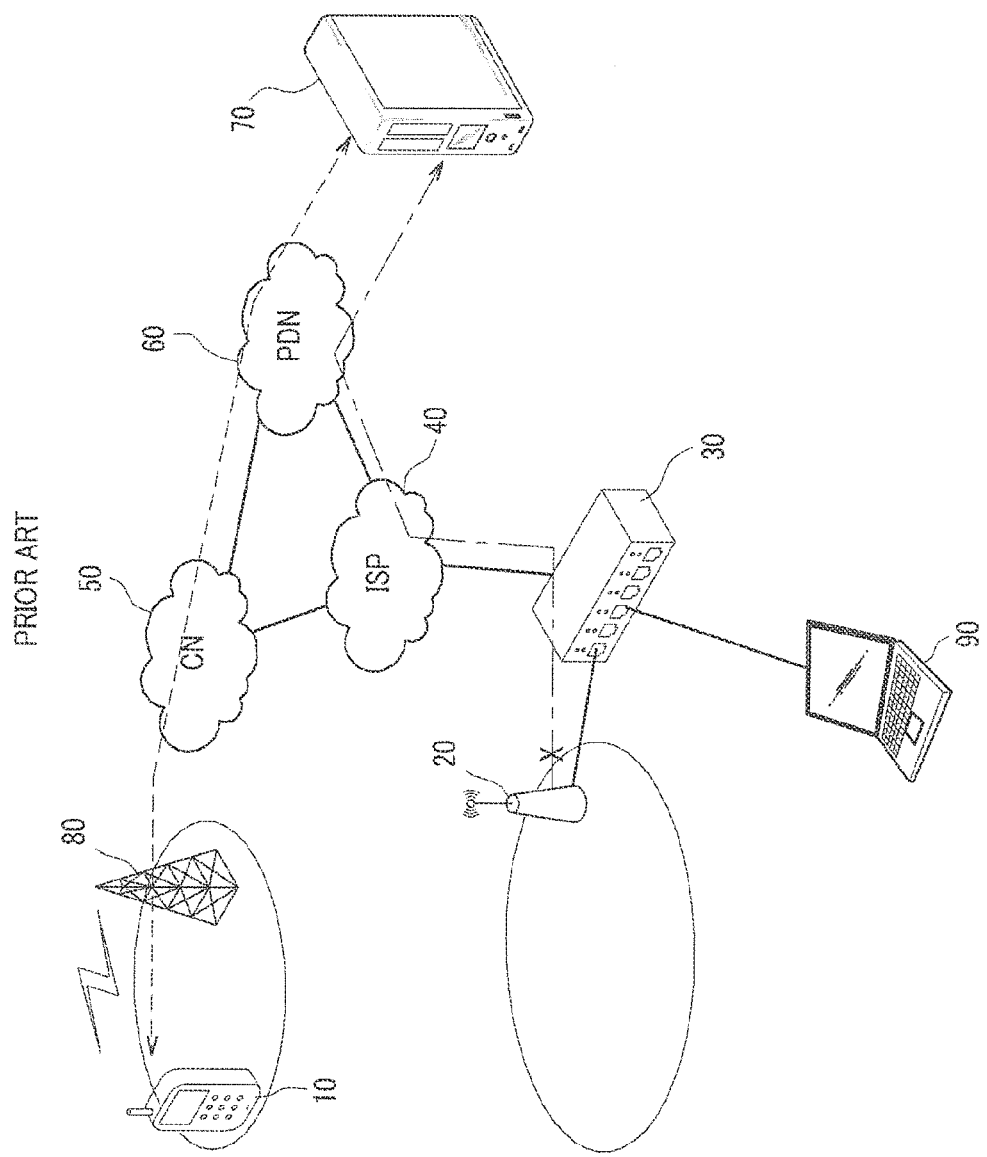
FIG. 2 is a diagram for describing a problem according to a conventional SIPTO method.
Figure 3:
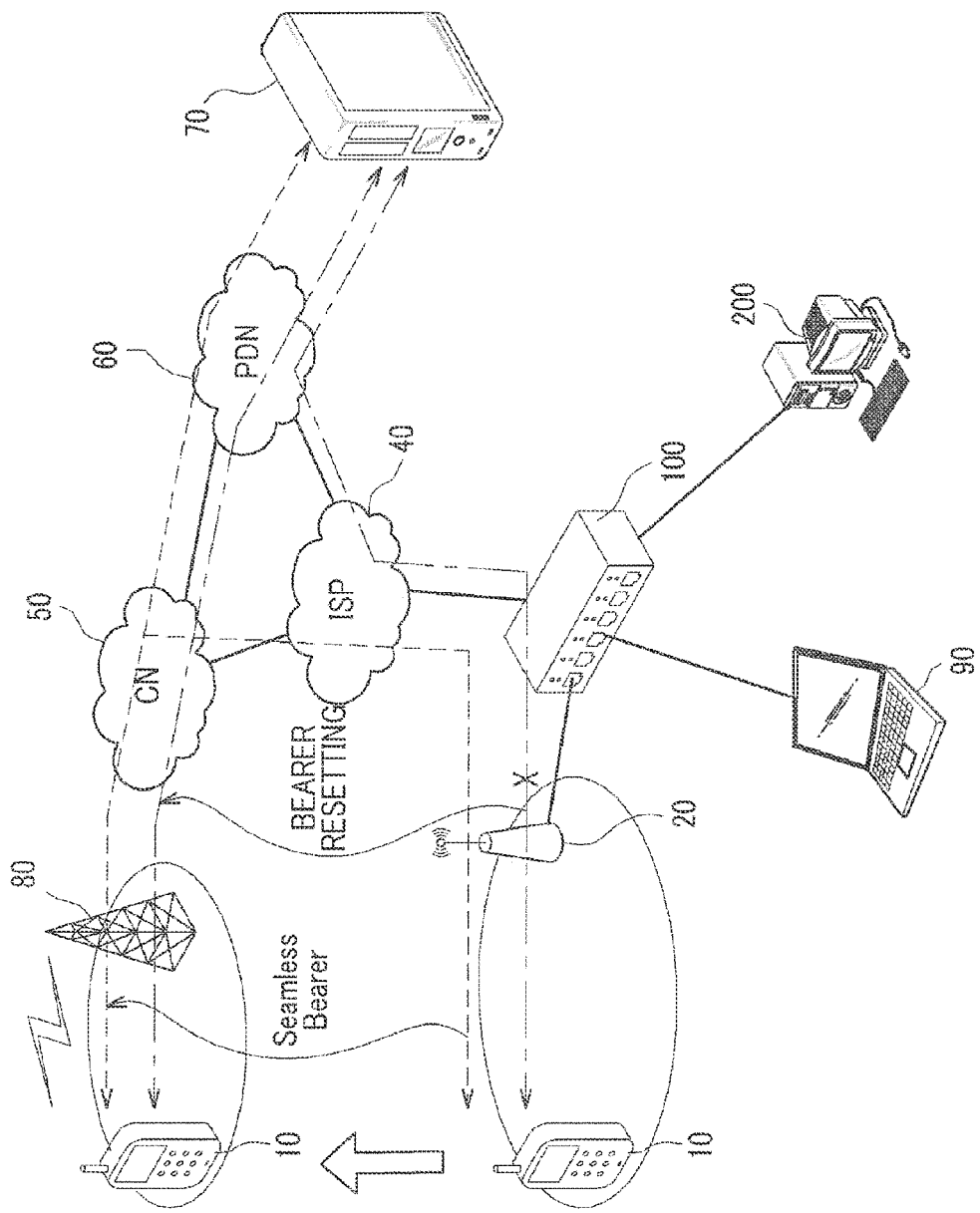
FIG. 3 is a diagram for describing a principle of a method of offloading wireless data in a core network using a femtocell according to an embodiment of the present invention.

FIG. 3 is a diagram for describing a principle of a method of offloading wireless data in a core network using a femtocell according to an embodiment of the present invention, and illustrates a method of offloading in a network to which SDN technology is applied. In FIG. 3, reference numeral 10 represents a mobile communication terminal, reference numerals 20 and 80 represent a femto base station and a macro base station managing a femtocell and a macro cell, respectively. Reference numerals 40, 50, and 60 represent an Internet service provider (ISP), a mobile communication core network, for example, an evolved packet core (EPC) network, and a public data network or packet data network (PDN), respectively.

Meanwhile, in the SDN, an SDN controller 200 having a network control plane may be separated from an SDN switch 100 which is a physical network having a data transfer plane, and the SDN switch 100 may be connected to an Internet and the femto base station 20. Reference numerals 90 and 70 represent a local terminal and an external server connected to the SDN switch 100 and the PDN 60, respectively. Meanwhile, an agent program for performing communication between the SDN switch 100 and the SDN controller 200 may be installed in the femto base station 20 according to the present invention.

The method of offloading according to the present invention may selectively determine whether to allow a selective Internet protocol traffic offload (SIPTO) by further using quality of service (QoS) information of a bearer set between the mobile communication terminal 10 and the core network 50. For example, data having real-time processing characteristics (hereinafter, real-time data) such as VOIP voice data may be determined so as to necessarily pass through the core network 50 without allowing the SIPTO (refer to a dotted line of FIG. 3), and only general packet data which does not require a real-time processing may be determined as an offload target (refer to a dot-dashed line of FIG. 3).

As a result, even when the mobile communication terminal 10 deviates from a femtocell area and enters a macro cell area, the bearer transmitting the real-time data may be maintained as it is. Accordingly, important inconvenience such as communication delay and disconnection may not be generated. On the other hand, the non-real-time data traffic such as general packet data may be transmitted by making a detour onto the Internet 40 by the SIPTO during which the mobile communication terminal 10 is included in the femtocell area, and when the mobile communication terminal 10 deviates from the femtocell area and enters the macro cell area, the bearer may be inevitably reset. Therefore, although the data delay is inevitably generated, inconvenience of a user may be relatively small for the non-real-time data.

Figure 4:
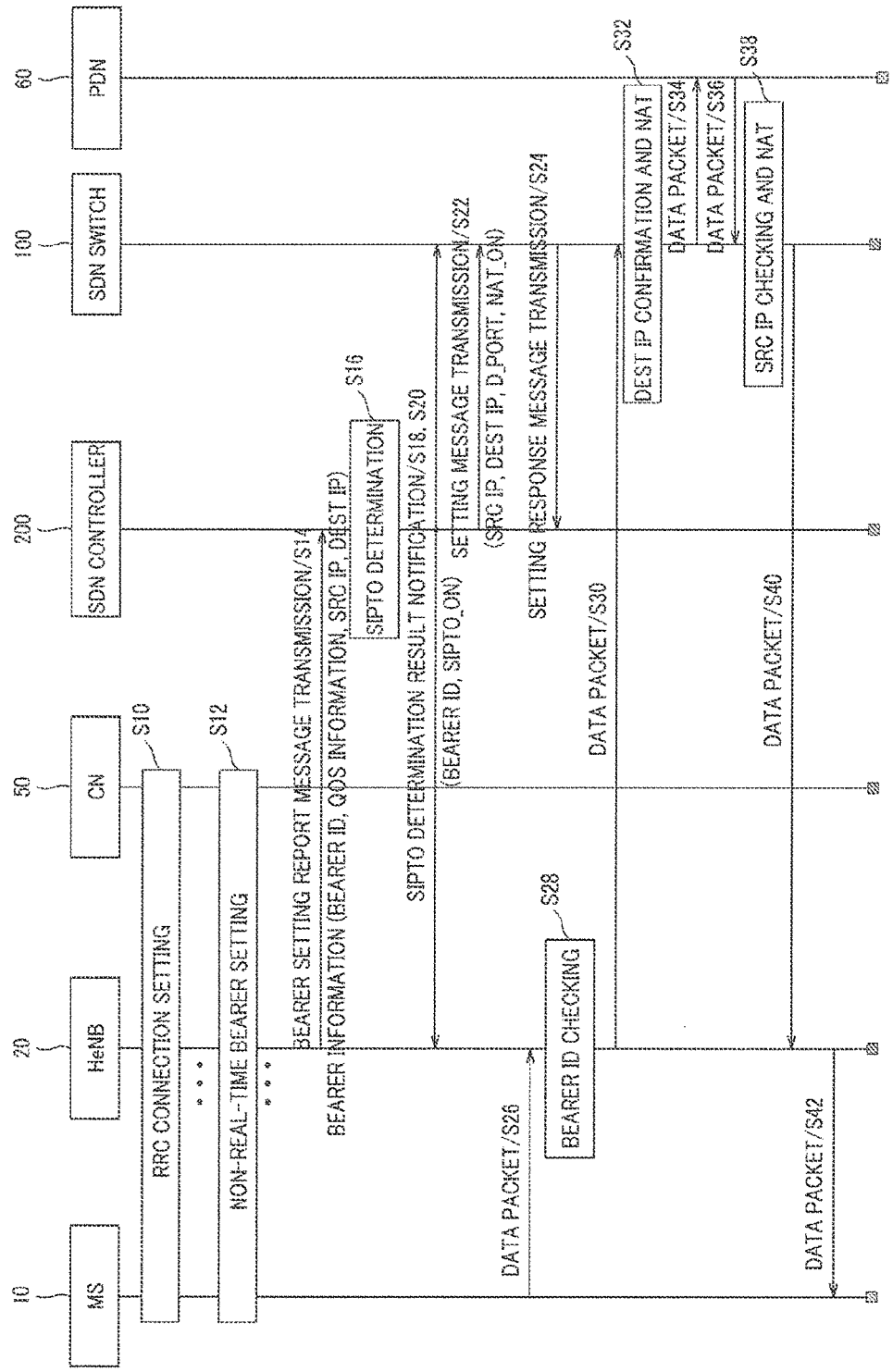
FIG. 4 is a sequence chart for describing an operation of processing non-real-time data in a method of offloading wireless data in a core network using a femtocell according to an embodiment of the present invention.

FIG. 4 is a sequence chart for describing an operation of processing non-real-time data in a method of offloading wireless data in a core network using a femtocell according to an embodiment of the present invention.

First, an evolved packet system (EPS) may use a concept which is called an EPS bearer in order to route IP traffic from a gateway to a mobile communication terminal in the PDN. The EPS bearer may be an IP packet flow based on a QoS between a gateway and a user terminal. A plurality of bearers may support different QoSs, and may be set by a user to connect to different PDNs. For example, a user related to voice communication (VOIP, etc.) may simultaneously perform a download of a file transfer protocol (FTP) or a web browsing. In this case, the VOIP bearer may provide the QoS needed for the voice communication, and a "best_effort" bearer may be allocated for the web browsing or the FTP. Accordingly, when checking a QoS parameter of the allocated bearer, whether a corresponding bearer is for real-time data may be confirmed.

As shown in FIG. 4, the mobile communication terminal 10 may first perform a radio resource control (RRC) connection establishment operation in order to attach to a core network 50 through a femto base station (HeNB) 20, and when the RRC connection establishment succeeds (operation S10), a basic control channel may be set between the mobile communication terminal 10 and the femto base station 20. Next, a bearer, a non-real-time bearer in FIG. 4, for transmitting user data may be further set between the mobile communication terminal 10 and the femto base station 20 (operation S12).

Next, when detecting the setting of the bearer, the femto base station 20 may transmit the detected content to the SDN controller 200 using a bearer setting report message (operation S14). At this time, the bearer setting report message may include bearer information indicating that any bearer is set, such as an bearer ID, a QoS parameter, a source IP address, a destination IP address.

Next, the SDN controller 200 may detect that a currently set bearer is for the non-real-time data using the QoS parameter included in the bearer setting report message, may determine to allow the SIPTO (operation S16), and may inform the femto base station 20 and the SDN switch 100 of the determining result using a notification message (operations S18 and S20). The notification message may include a SIPTO activation indicator fact SIPTO_ON, and bearer information, for example, a bearer ID.

The SDN controller 200 may transmit a setting message including a source IP address, a destination IP address, a destination port ID, SRC_NAT_control=ON, a source IP address for network address translation (NAT), a source port for NAT, etc. to the SDN switch 100 (operation S22). Next, the SDN switch 100 may transmit a setting response message indicating to transmit data to the destination port after performing a NAT operation when receiving a message suitable for a corresponding condition to the SDN controller 200 (operation S24).

In a state that the setting for offloading the wireless data is completed, when a non-real-time data packet is transmitted from the mobile communication terminal 10 to the femto base station 20 (operation S26), the femto base station 20 may check the bearer ID of the data (operation S28). Since it is determined to allow the SIPTO in the operation S20 with respect to the bearer, the femto base station 20 may transmit the data packet to the SDN switch 100 instead of the core network 50 (operation S30).

Next, the SDN switch 100 may check whether to satisfy a condition by comparing the source IP address and the destination IP address of the data packet with a predetermined value (operation S32), and when the condition is satisfied, the SDN switch 100 may change the source IP address to the source IP address for the NAT according to the setting of the NAT, and transmit the result to the destination port which is previously specified (operation S34).

On the other hand, when an arbitrary data packet is received from the PDN 60 with respect to the bearer (operation S36), the SDN switch 100 may check whether to satisfy a condition by comparing the destination IP address and the destination port of the data with a predetermined value (operation S36), and when the condition is satisfied, the SDN switch 100 may perform a conventional NAT operation, and recover an IP address of the mobile communication terminal 10 and a port number used for a service in the mobile communication terminal 10 (operation S38). The data packet on which the NAT operation is performed may be transmitted to the mobile communication terminal 10 through the femto base station 20 (operations S40 and S42).

Figure 5:
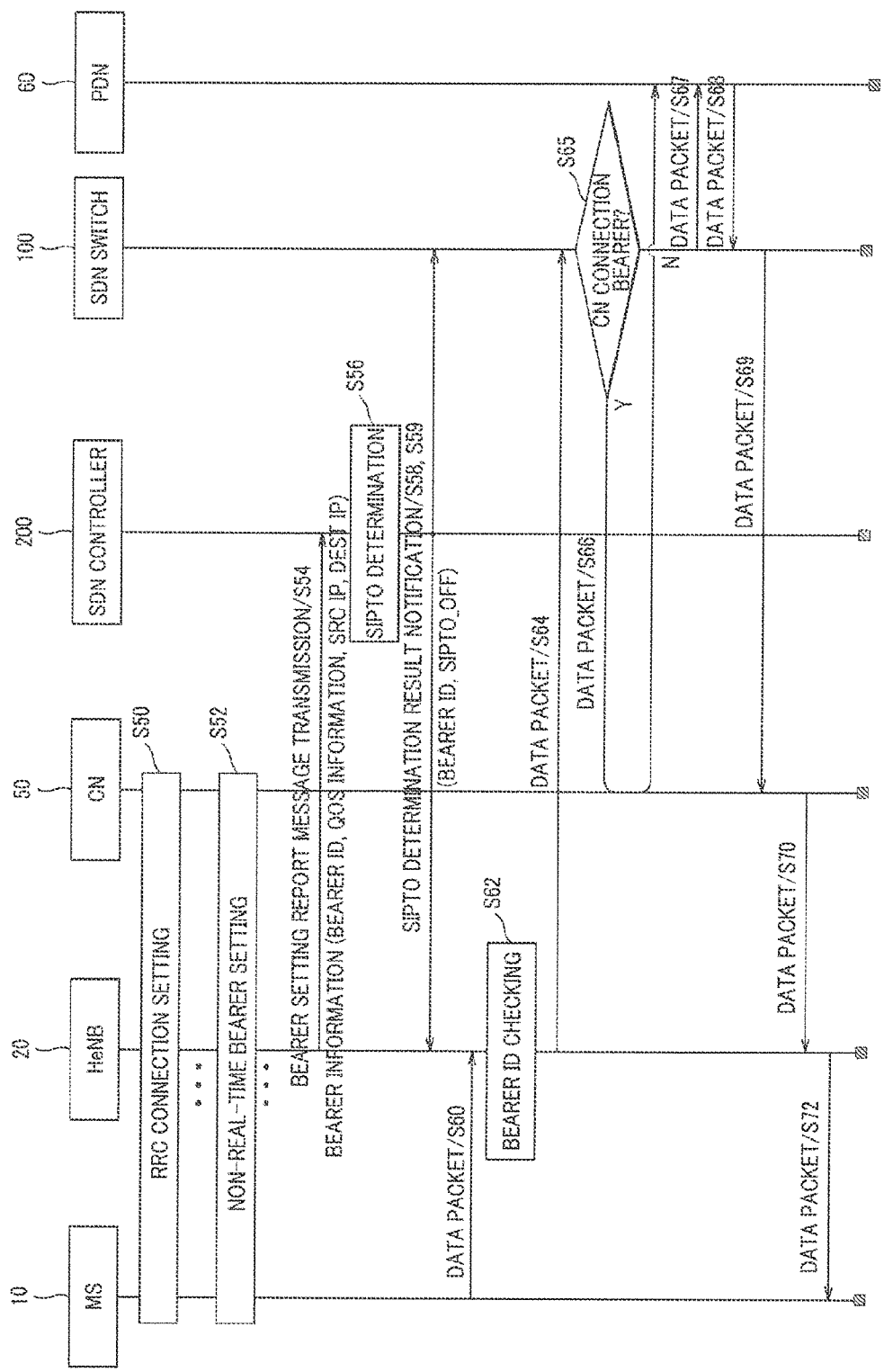
FIG. 5 is a sequence chart for describing an operation of processing real-time data in a method of offloading wireless data in a core network using a femtocell according to an embodiment of the present invention.

FIG. 5 is a sequence chart for describing an operation of processing real-time data in a method of offloading wireless data in a core network using a femtocell according to an embodiment of the present invention, and since operations S50 to S56 are the same as the operations S10 to S14, detailed description will be omitted.

As shown in FIG. 5, when data from the mobile communication terminal 10 is real-time data, for example, VOIP voice data, the bearer may be set again, and communication disconnection may be generated in the operation when the mobile communication terminal 10 deviates from the femtocell area and enters the macro cell area after offloading the real-time data onto the Internet 40. In the present invention by considering this situation, for the real-time data, it may be determined so that the data always passes through the core network 50 without offloading onto the Internet 40, that is, it may be determined not to allow the SIPTO (operation S56), and the femto base station 20 and the SDN switch 100 may be informed of a notification message including the determining result (operations S58 and S59). The notification message may include a SIPTO deactivation indicator SIPTO_OFF, and bearer information, for example, a bearer ID.

Next, when the real-time data from the mobile communication terminal 10 is transmitted to the femto base station 20 (operation S60), the femto base station 20 may check the bearer ID of the data packet (operation S62). Since the result of checking the bearer is previously determined as the SIPTO deactivation with respect to a corresponding bearer, the corresponding data packet may be transmitted to the SDN switch 100 using the bearer connected to the core network 50 (operation S64).

Meanwhile, when receiving the data packet from the femto base station 20, the SDN switch 100 may check whether the bearer is a bearer connected to the core network 50 (operation S65), and when the bearer is the bearer connected to the core network 50, the SDN switch 100 may transmit the corresponding data packet to the core network 50, and the core network 50 may transmit the data packet to the PDN 60 (operation S66). On the other hand, when the bearer is not the bearer connected to the core network 50 but a bearer connected to the external server 70 based on the result of checking in the operation S65, the SDN switch 100 may directly transmit the corresponding data packet to the external server 70 through the PDN 60 (operation 67).

On the contrary, the real-time data packet transmitted from the PDN 60 to the mobile communication terminal by sequentially passing through the core network 50 and the femto base station 20 (operations S68, S69, S70, and S72).

According to the method of offloading wireless data in a core network using a femtocell, a traffic load of a mobile communication network can be reduced and convenience of a user can be maximized by determining to offload the wireless data passing through the core network onto a local network according to whether the data is real-time data, that is, by selectively allowing the offload of only non-real-time wireless data.

Hereinbefore, exemplary embodiments of the method of offloading wireless data in a core network using a femtocell were described in detail, but they are only an example. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of offloading wireless data in a core network using a femtocell, wherein the method is performed on the wireless data passing through the core network of a mobile communication network in an Software-defined networking (SDN) including SDN switch connected to a femto base station of the mobile communication network and an Internet, and a SDN controller separated from the SDN switch and configured to control the SDN switch, the method comprising:

(a) receiving bearer information set between the femto base station and a mobile communication terminal from the femto base station, by the SDN controller;
(b) checking whether the data passing through the core network is real-time data based on the bearer information received in the operation (a), by the SDN controller;
(c) determining not to perform a selective Internet protocol traffic offload (SIPTO) when the data is the real-time data and to perform the SIPTO when the data is non-real-time data based on the checking result in the operation (b), by the SDN controller;
(d) informing the femto base station and the SDN switch of the determining result whether to perform the SIPTO, by the SDN controller;
(e) checking a bearer ID when the femto base station receives data from the mobile communication terminal, selecting a bearer connected to the core network or a bearer connected to an external server according to a confirmation result after confirming the determining result whether to perform the SIPTO, and transmitting corresponding data to the SDN switch using the selected bearer; and
(f) directly transmitting data of which the femto base station performs the SIPTO to not the core network but an external network, by the SDN switch.

2. The method of offloading the wireless data in the core network using the femtocell of claim 1, wherein the operation (b) checks whether the data is the real-time data based on a QoS parameter included in the bearer information.

3. The method of offloading the wireless data in the core network using the femtocell of claim 1, wherein the bearer information transmitted from the femto base station in the operation (a) comprises a bearer ID, a QoS parameter, a source IP address, and a destination IP address.

4. The method of offloading the wireless data in the core network using the femtocell of claim 1, wherein a message for informing the femto base station and the SDN switch of the determining result whether to perform the SIPTO in the operations (c) and (d) comprises a SIPTO determination result and a bearer ID.

* * * * *